(12) United States Patent
Figenschou et al.

(10) Patent No.: US 8,304,651 B2
(45) Date of Patent: *Nov. 6, 2012

(54) UMBILICAL

(75) Inventors: Arild Figenschou, Billingstad (NO); Finn Peter Gjerull, Høvik (NO)

(73) Assignee: Aker Subsea AS, Lysaker (NO)

( * ) Notice: Subject to any disclaimer, the term of this patent is extended or adjusted under 35 U.S.C. 154(b) by 621 days.

This patent is subject to a terminal disclaimer.

(21) Appl. No.: 12/520,111

(22) PCT Filed: Dec. 14, 2007

(86) PCT No.: PCT/NO2007/000445
§ 371 (c)(1),
(2), (4) Date: Jun. 19, 2009

(87) PCT Pub. No.: WO2008/075965
PCT Pub. Date: Jun. 26, 2008

(65) Prior Publication Data
US 2010/0012342 A1 Jan. 21, 2010

(30) Foreign Application Priority Data
Dec. 20, 2006 (NO) .................................. 20065944

(51) Int. Cl.
*F16L 11/12* (2006.01)
*H01B 7/00* (2006.01)

(52) U.S. Cl. .................. 174/47; 174/110 R; 174/113 R; 174/113 C (58) Field of Classification Search .................... 174/47, 174/15.6, 15.7, 19, 113 C, 113 A, 102 R; 385/105, 110, 112, 114; 138/113
See application file for complete search history.

(56) References Cited

U.S. PATENT DOCUMENTS

| 2,800,524 | A |   | 7/1957  | Van Lear |
|-----------|---|---|---------|----------|
| 3,526,086 | A | * | 9/1970  | Morgan ..................... 138/111 |
| 3,993,860 | A |   | 11/1976 | Snow et al. |
| 4,256,146 | A |   | 3/1981  | Genini et al. |
| 4,336,415 | A | * | 6/1982  | Walling ....................... 174/47 |
| 4,707,569 | A |   | 11/1987 | Yoshimura et al. |
| 4,780,574 | A |   | 10/1988 | Neuroth |
| 5,261,462 | A |   | 11/1993 | Wolfe et al. |
| 5,268,971 | A |   | 12/1993 | Nilsson et al. |
| 5,495,547 | A |   | 2/1996  | Rafie et al. |
| 5,813,106 | A | * | 9/1998  | Haug et al. ..................... 29/429 |
| 5,902,958 | A | * | 5/1999  | Haxton ......................... 174/47 |

(Continued)

FOREIGN PATENT DOCUMENTS

GB        953833  A     4/1964

(Continued)

*Primary Examiner* — William Mayo, III
(74) *Attorney, Agent, or Firm* — Birch, Stewart, Kolasch & Birch, LLP (57) ABSTRACT

An umbilical includes a number of fluid pipes, electric wires and/or optical conductors, filler material located at least partially around and between the fluid pipes and the wires/conductors, and they are collectively gathered in a twisted bundle by a laying operation. The umbilical further includes a protective jacket that encompasses the fluid pipes, the wires/conductors and the filler material, and at least one load carrying element located in the cross section of the umbilical. Optionally, one or more fluid pipes constitute load carrying elements. The fluid pipes, the wires/conductors, the filler material and the at least one load carrying element, are alternately laid, i.e. by continuously alternating direction, in the entire or part of the longitudinal extension of the umbilical.

23 Claims, 5 Drawing Sheets

U.S. PATENT DOCUMENTS

| | | | |
|---|---|---|---|
| 6,046,404 A * | 4/2000 | Figenschou et al. | 174/47 |
| 6,102,077 A * | 8/2000 | Legallais et al. | 138/115 |
| 6,146,052 A | 11/2000 | Jacobsen et al. | |
| 6,283,206 B1 * | 9/2001 | Fraser et al. | 166/242.3 |
| 6,472,614 B1 * | 10/2002 | Dupont et al. | 174/70 S |
| 6,538,198 B1 * | 3/2003 | Wooters | 174/47 |
| 6,940,054 B1 * | 9/2005 | Heggdal | 219/629 |
| 7,473,844 B2 * | 1/2009 | Figenschou et al. | 174/47 |
| 7,485,811 B2 * | 2/2009 | Mjelstad | 174/113 R |
| 2003/0116212 A1 * | 6/2003 | Thomson | 138/111 |
| 2006/0144456 A1 | 7/2006 | Donnison et al. | |
| 2006/0193572 A1 * | 8/2006 | Mjelstad | 385/101 |
| 2007/0205009 A1 * | 9/2007 | Figenschou | 174/47 |
| 2007/0253778 A1 * | 11/2007 | Figenschou | 405/169 |
| 2010/0054677 A1 * | 3/2010 | Figenschou et al. | 385/101 |

FOREIGN PATENT DOCUMENTS

| | | |
|---|---|---|
| GB | 2 219 063 A | 11/1989 |
| GB | 2 395 539 A | 5/2004 |
| GB | 2395539 * | 5/2004 |
| NO | 311988 B1 | 2/2002 |
| WO | WO 2004/111515 * | 12/2004 |
| WO | WO-2004/111515 A1 | 12/2004 |

* cited by examiner

PRIOR ART

APPENDIX E—UMBILICAL CONSTRUCTION

Figure E-1—Typical Umbilical with Inner and Outer Thermoplastic Sheath

Figure E-2—Typical Umbilical with Inner and Outer Roving Sheath

Fig.8.
PRIOR ART

UMBILICAL

CROSS-REFERENCE TO RELATED APPLICATIONS

This application is the National Phase of International Application No. PCT/NO2007/000445, filed on Dec. 14, 2007, and which claims priority under 35 U.S.C. §119 to Application No. 2006 5944, filed in Norway on Dec. 20, 2006.

BACKGROUND OF THE INVENTION

1. Field of the Invention

The present invention relates to an umbilical comprising a number of fluid pipes, electric wires and/or optical conductors, and filler material located at least partially around and between the fluid pipes and the wires/conductors. They are collectively gathered in a twisted bundle by means of a laying operation. A protective jacket encompasses the fluid pipes, the wires/conductors and the filler material. At least one load carrying element is located at a predetermined location in the cross section of the umbilical. Optionally, one or more fluid pipes constitute the load carrying elements.

The invention also relates to a method of manufacturing the umbilical.

2. Description of Background Art

It is to be noted that the invention finds use in both the more traditional umbilical and the relatively newly suggested power umbilical, i.e. an umbilical that is able to transfer large amounts of electric power between the sea surface and equipment located at the sea bed. This application relates to the more traditional umbilical, while the power umbilical is subject to a separate patent application filed on the same day as the present application. It is further to be noted that the present umbilical primarily is intended to be used for static purposes and its tensional capacity is first of all required during the deployment thereof, subsequently to be resting more or less stationary on the sea bed.

The traditional way to perform the laying operation of several elongate elements is for example shown in NO 174940 (WO 93/17176) and NO 971984. When looking into the figures in the first document, in particular FIG. 1, the machinery normally required to manufacture such umbilical is shown. As shown, the machinery is complicated, space demanding, voluminous, and accordingly very cost intensive. In addition, due to the size, the machinery necessarily needs to be stationary, i.e. be located in a large facility, preferably close to a harbor.

The machinery necessarily needs to have these dimensions in order to fulfil its functions, namely to be able to wind the elongate elements together into a bundle that extends helically in the longitudinal direction thereof having a predetermined laying length, typically 1.5 to 15 meters per revolution, depending on the intended application.

It has been a distinct desire from the industries to be able to manufacture an umbilical by use of considerably simpler machinery. In addition, there is a desire to have a mobile facility that can produce the umbilical at the site, or close to the site where the umbilical is to be installed. How to enable this, in consideration of the premises above? Some regards have been necessary to take, and in particular the ability of the umbilical to take up and withstand tensional loads. This is discussed below.

When such a bundle of elongate elements are subjected to tensional loads, for example during deployment on deeper waters, the twisted, or wound, elements will tend to "straighten out" or "twist open." It is the load carrying elements in the cross section that are dedicated to take up the tensional loads. The load carrying elements can be pipes, steel wires or elements made of composite material, either in the form of individual composite rods distributed on the cross section or rods gathered in bundles. An example of composite material is carbon fiber.

With the now proposed solution for the laying operation of the umbilical, which simplifies the manufacturing process substantially, the load carrying elements will not necessarily be able to fulfil their function, namely be able to transfer substantial loads, or tensional loadings. They will, as indicated above, only tend to straighten out. However, such a new solution will require only a very simple machinery of manufacture compared with the traditional ones. So all the desires set forth above will be fulfilled. But as one will understand, a new problem is created—how to enable the load carrying function?

This is an acknowledged problem and in this respect we refer to U.S. Pat. No. 6,472,614 in the name Coflexip. In column 1, from the middle of the page and down, it is indeed described that the elements of the umbilical normally (traditionally) are wound together in the well known S-Z configuration, which means that it is wound alternating with shifting direction. Further, it is described that since the S-Z configuration cannot withstand substantial tensile stress without unwinding (as described above), additional layers of armouring (steel or KEVLAR, aramid fibers, for example) must be wound counter helically around this bundle to take up the tensile stress. The armoring consists of a plurality of steel wires or rods placed side by side with small pitch relative to the longitudinal axis of the umbilical.

Figure 7:
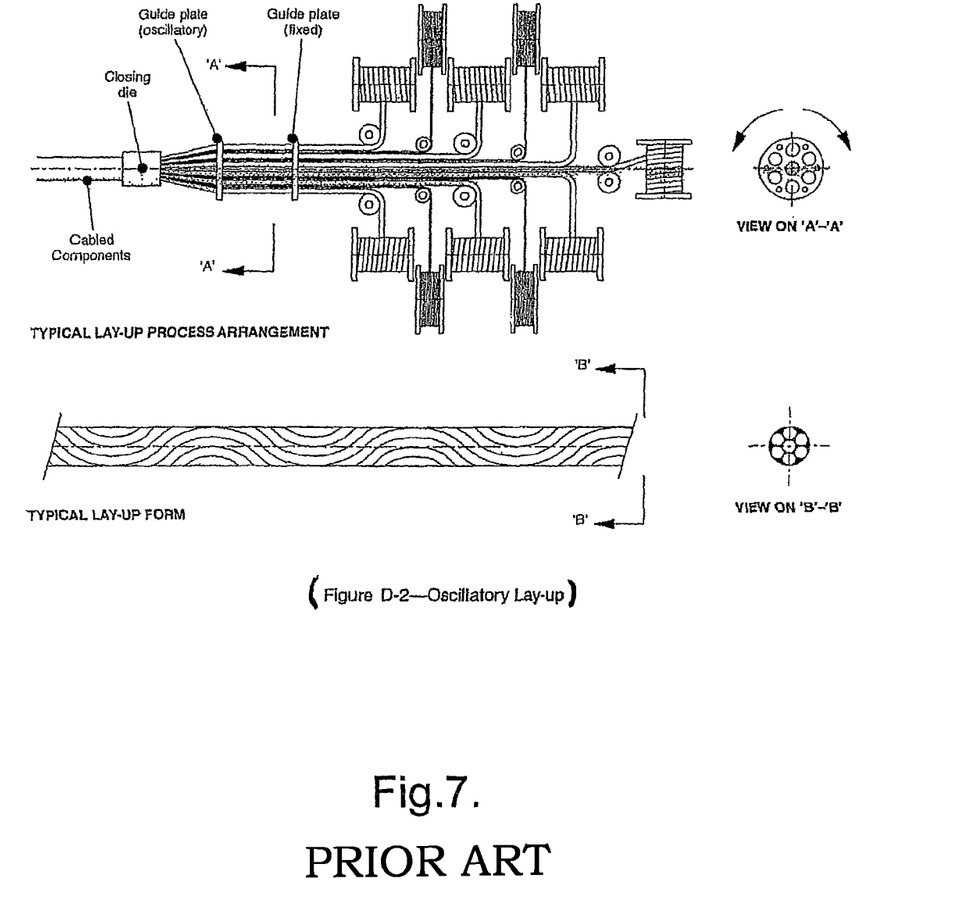
FIG. 7 (prior art) shows extracts from API (American Petroleum Institute) specification 17E, FIG. D-2 that shows schematically a S-Z laid cable and laying machine.
Figure 8:
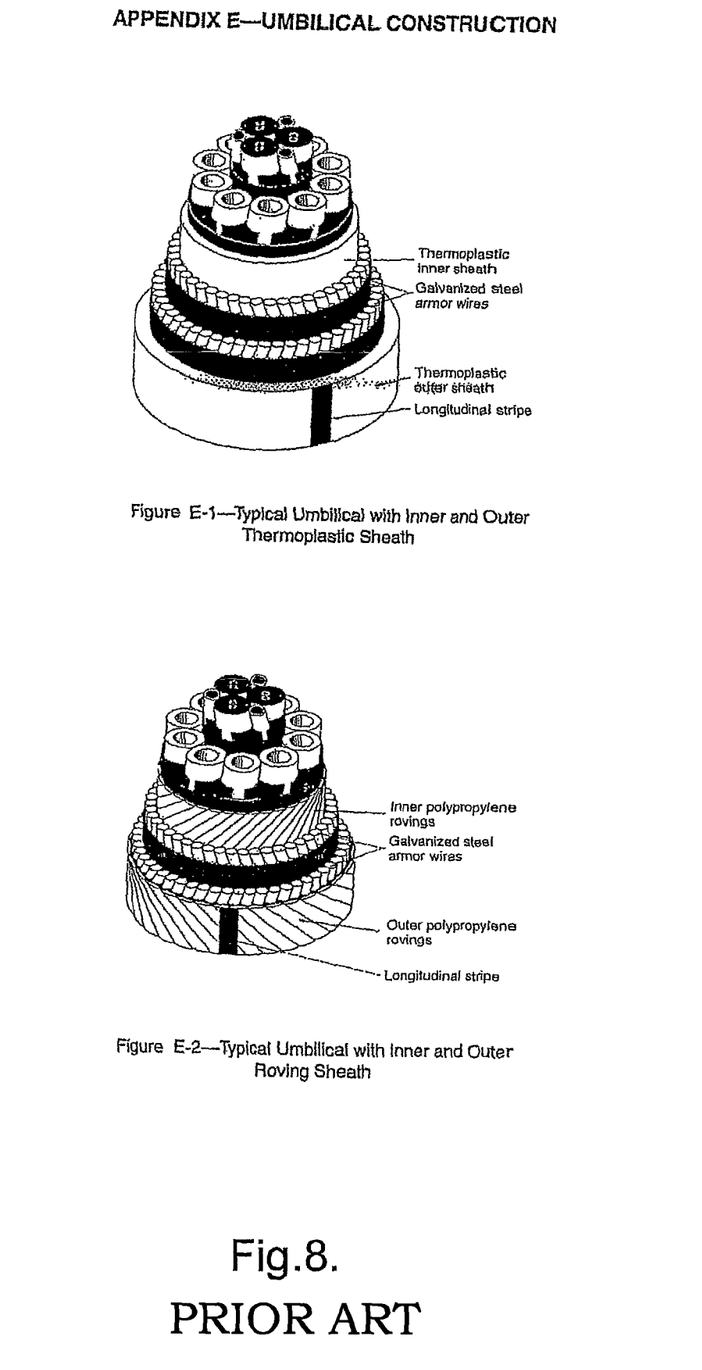
FIG. 8 (prior art) also shows extracts from API (American Petroleum Institute) specification 17E, FIG. E-1 and E-2 that show typical umbilicals having thermoplastic pipes laid in this way.

In order to teach how this umbilical typically looks, U.S. Pat. No. 6,472,614 discloses that this is disclosed in API (American Petroleum Institute) specification 17E, "Specification for Subsea Production Control Umbilicals," in particular pages 42, 43 and 44. Abstracts from this are shown in FIGS. 7-8 and are marked with "prior art". It is further stated in U.S. Pat. No. 6,472,614, at the bottom of column 2, that there is no standard for steel tube umbilicals at this moment, but that it will come. This we understand as a confirmation of that the pipes that are shown on page 43 of the specification 17E are thermoplastic pipes—and not steel pipes as the present invention relates to.

Such is also included to illustrate the traditional way of thinking when it comes to S-Z laying (winding) combined with load carrying. This requires armoring rods that are helically wound (not S-Z) in at least two layers and each layer is wound in opposite directions to each other in order that they shall be able to act as the load carrying elements in the cross section.

As far as we know, no one has until this date carried out S-Z laying (winding) of the steel pipes in an umbilical, just because they perform the load carrying function and will, by applying axial loads of some magnitude, tend to straighten out (unwind), just as described in said U.S. Pat. No. 6,472,614. In addition, the steel pipes naturally are inherently rigid by nature and consequently intractable to handle in such a laying operation.

Another problem with this type of subsea umbilicals has been that pipes and cables need to be spliced relatively frequently, perhaps every 500 meters. This results in a substantial number of joints, if lengths of several tenths of kilometers are to be supplied. Every single splicing operation is time consuming. In complicated cross sections of the umbilical, it may take a couple of days to perform such a splicing operation.

Thus a challenge has been prevailing in the task to be able to manufacture substantial lengths of umbilicals having complicated cross sections and with fewer splices than before; in brief to achieve a more continuous and effective production. Similarly, as before, it is a demand that the umbilical can be coiled up on carousels or reels for shipping and transportation purposes.

SUMMARY OF THE INVENTION

In accordance with the present invention an umbilical of the introductory kind is provided, which is distinguished by the fact that the fluid pipes, the wires/conductors, the filler material and possibly the at least one load carrying element, are alternately laid, i.e. by continuously alternating direction, in the entire or part of the longitudinal extension of the umbilical, combined with that the laid bundle is kept fixed substantially torsion stiff by the protective sheath, possibly with the addition of a strength band, or tape, which is helically wound about the bundle just internal of the protective sheath.

It is to be understood that the strength band, or tape, can be varied according to which depths the umbilical is to be deployed, or, actually, may be omitted completely. At small depths, the strength band can be one simple ribbon, strip or tape just to keep the bundle together until the outer sheath is extruded thereon. When the depth becomes deeper, it may be necessary to use a steel band that is wound around the bundle. A detailed explanation appears from the text below.

According to the idea of the invention, the present umbilical is designed in such a way that the wound elements are prevented from unwinding, in spite of the fact that they are S-Z wound. This is achieved in that:

a). the twisted elements are in engagement with the filler profiles, which fully or partly encloses the twisted elements;

b). the umbilical is sufficiently torsional stiff to counteract the torque that the load carrying elements generates under axial tension; and c) the inner friction counteracts that the elements unwind.

By this new way to lay umbilicals, so called S-Z laying, combined with an outer sheath and/or strength band or tape, the above described is achieved. Said in a different way, engagement of filler profiles in combination with the torque rigidity of the umbilical and internal friction counteracts that the S-Z laid bundle unwinds when the elements are put into tension. For umbilical applications where the tensional capacity of the S-Z laid elements is sufficient to take up the tension within the umbilical, it means that armoring is not necessary. The described umbilical immobilizes the steel pipes and the remainder elongate elements of the cross section both with regard to radial motion, axial elongation and torsion, and at the same time the steel pipes are able to fulfil their duty as load transferring elements in spite of their sinus configuration.

In addition, simpler and less comprehensive production machinery that requires less space and has lower cost, is achieved. It is also considered to be possible to make a mobile facility for direct use in the proximity of actual fields that are developed. It is further to be understood that to wind, for example, common electric conductors, or wires, by means of S-Z winding is commonly known. But to design and manufacture an S-Z laid umbilical where the components are able to take load, has never been done before, just as umbilicals having S-Z laid steel pipes has never before been manufactured.

In a suitable embodiment, the strength band, or the tape, is helically wound about the bundle in two or more layers, laid in opposite directions. Further, the strength band, or the tape, can be helically wound about the bundle by a relatively short laying length, like 0.1 to 0.5 meters.

The strength band can be of metallic material, like steel, lead or aluminium. Alternatively, the strength band can include fiber armored ribbon, fiber armored ribbon with a friction liner and textile ribbon, where the fiber armored ribbon can be reinforced with aramid fiber, carbon fiber, glass fiber and other synthetic materials.

As one will understand, the nature of the strength band regarding strength, rigidity and how tight it is applied to the bundle, is used to increase/decrease the torsion stiffness, which in turn influences on the load carrying capacity of the umbilical. In brief, one can say that the more deep waters the umbilical is to be deployed, the more torsion stiffness that is required.

It is to be understood that the laying of the fluid pipes, the wires/conductors, filler material and possibly other load carrying elements can alter direction at irregular intervals, while in another alternative embodiment it may alter direction at regular intervals.

In a typical embodiment, as one can recognize today, the laying will take place over approximately one half to three revolutions before it alters direction and is laid a corresponding number of revolutions in opposite laying direction before it once more alters direction.

In one embodiment, the umbilical includes one or more separate layers with load carrying elements as an outer layer that is located just within the sheath. These load carrying elements in each layer are, however, laid in a traditional way in a continuous helix in the same direction in the entire length extension of the umbilical. This will almost be as shown in said API standard, FIGS. 7 and 8.

Preferably, the load carrying elements can be light weight rods of composite material and/or steel string or steel wire and/or fiber rope and/or polyester rope and/or aramid threads. This finds its application when the depth exceeds a certain value. Then, one will take into use carbon rods, for example, in order to increase the axial stiffness with minimum increase of the umbilical weight.

In order to increase the torsional stiffness of the umbilical, the filler material can be designed such that longitudinal grooves or flutes are formed that the material in the outer sheath are penetrated into when the material is extruded thereon. This will create friction creating means that increases the torsional stiffness of the umbilical. This will further ensure that no relative rotation between the outer sheath and the filler material takes place.

When a strength band is used, the strength band is wound by a certain distance between each winding such that a gap is formed between each winding in order to achieve the above said penetration of the sheath material into the groove during the extruding operation.

According to the present invention also a method of the introductory said kind is provided, which is distinguished in that the fluid pipes, electric wires/conductors, the filler material and possibly the at least one load carrying element are alternating laid, i.e. by constantly shifting direction, in the entire or part of the longitudinal extension of the umbilical and that the or each load carrying element either is centrally or peripheral located during the manufacture, and that the laid bundle is retained substantially torsional stiff by applying the outer protective sheath, possibly by the addition of a strength band, or a tape, that is helically wound about the bundle after said laying operation is complete and before the protective sheath is applied.

The strength band, or the tape, can be wound in a helix about the bundle in two or more layers laid in different directions. The strength band, or the tape, can be helically wound about the bundle with relatively short laying length, such as 0.1 to 0.5 meters. The laying can be performed with alternating direction at irregular intervals, alternatively at regular intervals. The laying operation can typically take place over an area from approximately one half to three revolutions before the direction thereof changes.

In one embodiment, one or more separate layers of load carrying elements can be applied as an outer layer inside the sheath, said load carrying elements in each layer are laid continuously in a helix in the same direction in the entire longitudinal extension of the umbilical.

In one embodiment, the filler material can be configured such that longitudinally extending grooves or flutes are formed, and the material that forms the outer sheath is extruded onto the pipe bundle and penetrates into the grooves, to create the friction making means to increase the torsional stiffness of the umbilical.

When a strength band is used, the strength band, or tape, can be wound thereon by some certain distance apart between each winding such that a gap exists between each winding and the extruded material is enabled to penetrate into the grooves.

With the new way of laying the umbilical, a new type of laying machine that is considerably simpler than the previously used machines is contemplated. The laying operation can take place by means of oscillating motions rather than the traditional rotating motions, rotations of the huge bobbins that carry the cables, pipes and filler material.

This means that the fluid pipes, the wires/conductors, the filler material and possibly other load carrying elements can be supplied differently than with the previous machine, which implies that the production equipment can be differently organized. By continuously laying in one direction with the huge bobbins, in addition to the fact that they rotate about their own axis, they are also brought to continuous, timed rotation about the longitudinal axis of the umbilical in order to obviate torsional stresses within the elongate elements that are fed out of the bobbins. These potential torsional stresses will by the new laying method only arise in small extent since the laying direction is shifting all the time. Those torsional stresses that build up in one direction are in turn relived when the laying direction changes and diminish towards zero again. Thus, the huge bobbins do not need to rotate about the longitudinal axis of the umbilical, but can remain stationary. This simplifies the machine very significantly, so significantly that one can easily contemplate to construct a mobile facility where the umbilical can be produced proximate to where the umbilical is to be installed.

BRIEF DESCRIPTION OF THE DRAWINGS

Other and further objects, features and advantages will appear from the following description of preferred embodiments of the invention, which is given for the purpose of description, and given in context with the appended drawings where.

DETAILED DESCRIPTION OF THE PREFERRED EMBODIMENTS

Two embodiments of the umbilical cross sections shown in the FIGS. 1-6 will now be described, each having three variants. It is to be understood, however, that many embodiments and variants are within the scope of the appended claims. For the detailed construction of the traditional umbilical and how it is manufactured, reference is given to the previously mentioned WO 93/171776.

Figure 1:
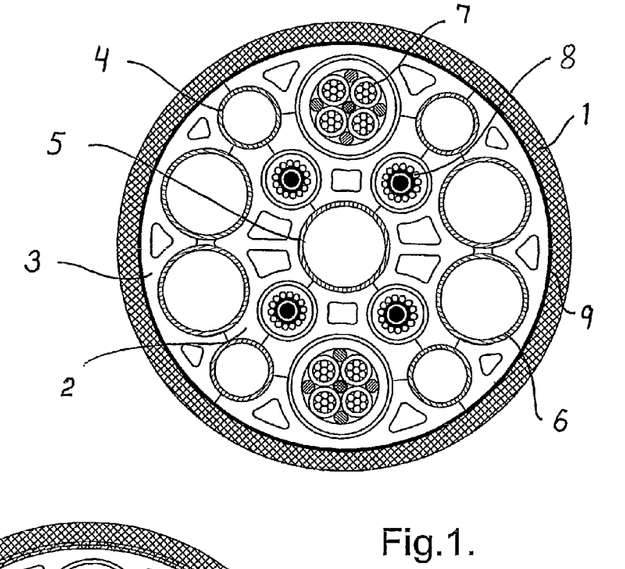
FIG. 1 shows a cross sectional view through a first embodiment of the umbilical according to the present invention with fiber tape being wound around the bundle of elongate element.

The umbilical according to FIG. 1 is basically constructed of the following elements: a bundle of elongate elements consisting of inner and outer channel elements 2, 3, for example of polyvinyl chloride (PVC), electric conductors/wires 7, optical conductors 8 and metallic fluid pipes 4, 5, 6, normally made of steel, that are laid together into said bundle. The bundle is kept together and in place by a strength band, in this variant according to FIG. 1, fiber ribbon 9 that is wound circumferentially around the bundle before an outer sheath 1, for example made of polyethylene (PE), is extruded onto the bundle.

As an illustrating example of the dimensions we talk about here, without thereby being considered as limiting, the diameter of the umbilical can, as an example, be 107 mm. The wires 7 can have a complete cross sectional area of 22 mm$^2$ and the optical conductors can have an outer diameter of 12 mm. The steel pipes 4 can be 12.5 mm and the pipes 5, 6 can have 18 mm as an outer diameter. The umbilical can have a net weight (empty) of 152 N/m and designed tensile capacity of 233 kN and strength at rupture of 416 kN.

The inner and outer channel elements 2, 3 are lying at least partly around and between the fluid pipes 4, 5, 6 and are typically made as rigid, elongate, continuous elements of plastic material. The fluid pipes 4, 5, 6, the wires 7, the conductors 8 and filler material 2, 3 are alternating laid, i.e. having ongoing changing direction, in the entire or part of the longitudinal extension of the umbilical. In addition the laid bundle is kept substantially torsional stiff by the protective sheath 1 by having the addition of a strength band in the form of a fiber ribbon 9 that is helically wound around the bundle immediately inside the protective sheath 1.

Figure 2:
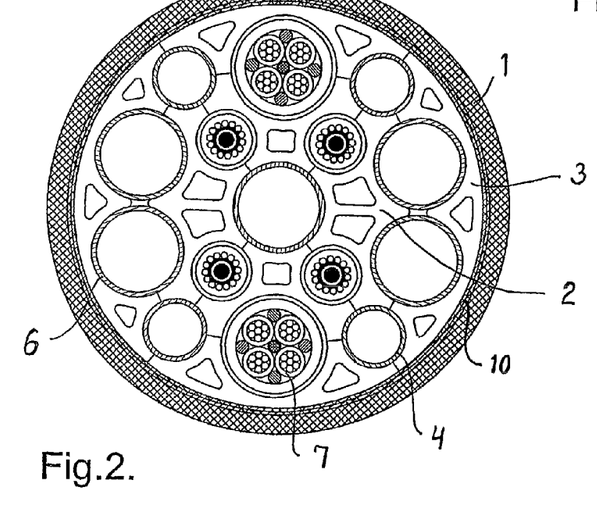
FIG. 2 shows a cross sectional view through a variant of first embodiment of the umbilical shown in FIG. 1 having steel band wound around the bundle of elongate elements.

The umbilical according to FIG. 2 is a variant of that shown in FIG. 1 and most of the elements are the same and are denoted with the same reference numbers. However, it is to be noted that the strength band now is a metal band, which is given the reference number 10, replacing the fiber ribbon shown in FIG. 1. This variant will normally be used when the deployment shall take place in deeper waters. The way in which it is bundled and wound together corresponds to the variant described above. As an example, without thereby being limiting, the metal band 10 in a typical embodiment can have a thickness of 0.8 mm and be wound in two layers and applied with tension in the band 10.

Figure 3:
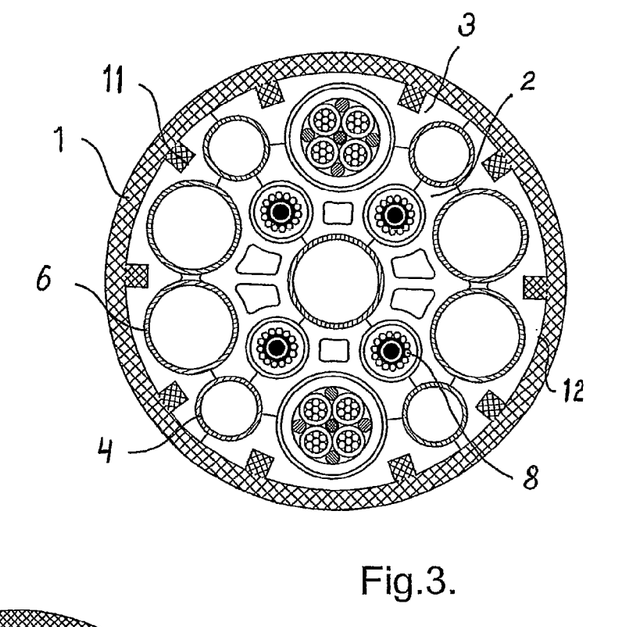
FIG. 3 shows a cross sectional view through another variant of first embodiment of the umbilical shown in FIG. 1 having longitudinally extending grooves in the filler material that are filled with sheath material.

The umbilical according to FIG. 3 is another variant of that shown in FIG. 1 and most of the elements are the same and are denoted with the same reference number. However, it is to be noted that the strength band now is a tape only, which is given the reference number 12 and has, actually, only a temporary function. This is to keep the bundle of elongate elements together until the outer sheath 1 of polyethylene is extruded onto the bundle. Further, longitudinally extending grooves 11 are made in or between the outer channel elements 3. This is done to be able to extrude the sheath material 1 into the grooves to lock the outer sheath 1 to the outer channel elements 3 or increase the friction therebetween in order to ensure sufficient torsional stiffness. To be able to extrude the sheath material into the grooves 11, the tape 12 is wound circumferentially by a predetermined space between each winding such that the sheath material can penetrate into the grooves 11. The way in which the umbilical is bundled and wound together corresponds to the variants described above.

Figure 4:
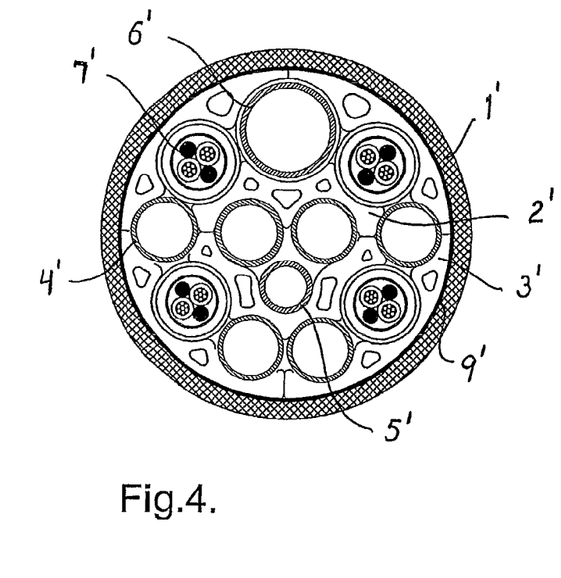
FIG. 4 shows a cross sectional view through a second embodiment of the umbilical according to the present invention with fiber tape being wound around the bundle of elongate elements.

FIG. 4 shows a second main embodiment of the umbilical having a somewhat smaller cross section. Most of the elements from the embodiment according to the FIGS. 1-3 are the same and are denoted with the same reference number with the addition of a prime mark. The umbilical according to FIG. 4 is as before basically constructed of the following elements: a bundle of elongate elements consisting of inner and outer channel elements 2', 3', for example of polyvinyl chloride (PVC), electric conductors/wires 7', possibly optical conductors and metallic fluid pipes 4', 5', 6', normally made of steel, that are laid together into said bundle. The bundle is kept together and in place by a strength band, in this variant according to FIG. 4, fiber ribbon 9' that is wound circumferentially around the bundle before an outer sheath 1', for example made of polyethylene (PE), is extruded onto the bundle. The way in which it is bundled and wound together corresponds to the variants described above.

Figure 5:
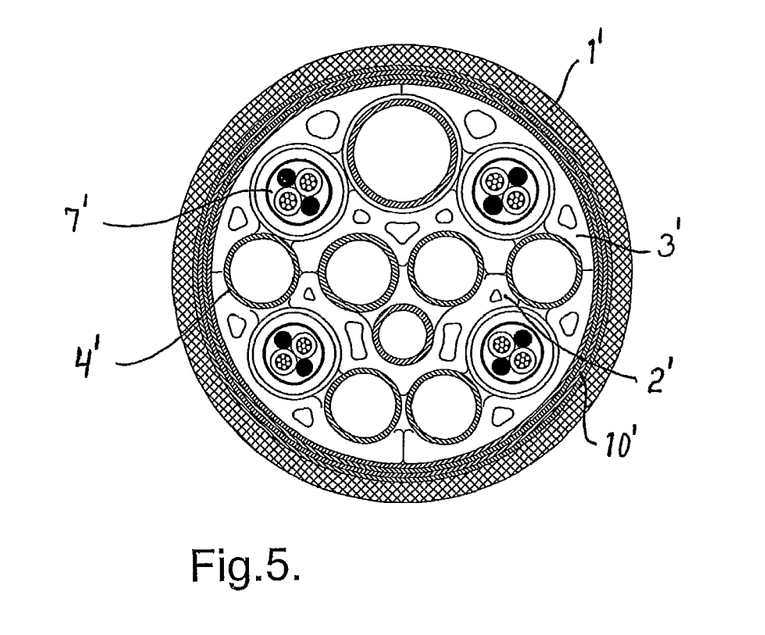
FIG. 5 shows a cross sectional view through a variant of the second embodiment of the umbilical shown in FIG. 4 having steel band wound around the bundle of elongate elements.

The umbilical according to FIG. 5 is a variant of that shown in FIG. 4 and most of the elements are the same and are denoted with the same reference numbers. However, it is to be noted that the strength band now is a metal band, which is given the reference number 10', replacing the fiber ribbon shown in FIG. 4. This variant will normally be used when the deployment shall take place in deeper waters. The way in which it is bundled and wound together corresponds to the variant described above.

Figure 6:
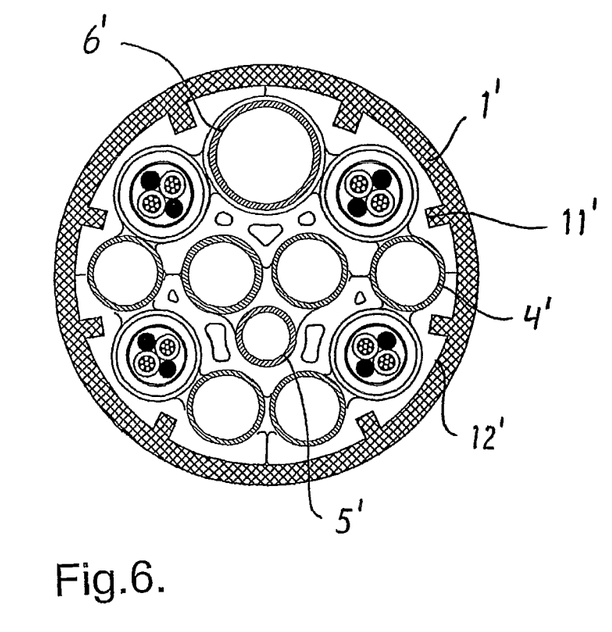
FIG. 6 shows a cross sectional view through another variant of the second embodiment of the umbilical shown in FIG. 4 having longitudinally extending grooves in the filler material that are filled with sheath material.

The umbilical according to FIG. 6 is still another variant of that shown in FIG. 4 and most of the elements are the same and are denoted with the same reference numbers. However, it is to be noted that the strength band now is a tape only, which is given the reference number 12', and has, actually, only a temporary function. This is to keep the bundle of elongate elements together until the outer sheath 1' of polyethylene is extruded onto the bundle. Further, longitudinally extending grooves 11' are made in or between the outer channel elements 3'. This is done to be able to extrude the sheath material 1' into the grooves to lock the outer sheath 1' to the outer channel elements 3' or increase the friction therebetween in order to ensure sufficient torsional stiffness. To be able to extrude the sheath material into the grooves 11' the tape 12' is wound circumferentially by a predetermined space between each winding such that the sheath material can penetrate into the grooves 11'. The way in which it is bundled and wound together corresponds to the variants described above.

FIGS. 7 and 8 show extracts from API (American Petroleum Institute) specification 17E, "Specification for Subsea Production Control Umbilicals", in particular pages 42 and 43. FIG. 7 shows schematically in the lower view an S-Z laid, or oscillatory laid umbilical. The upper figure shows totally schematically how the machinery for this type of laying is contemplated. FIG. 8 shows two variants of umbilicals that can be laid in this way, then as mentioned with thermoplastic fluid pipes.

The invention claimed is:

1. An umbilical comprising:
   a number of fluid pipes, electric wires and/or optical conductors, filler material located at least partially around and between the fluid pipes and the wires/conductors, the number of fluid pipes, the filler material and the electric wires/conductors being gathered in a twisted bundle by means of a laying operation;
   a protective sheath that encompasses the fluid pipes, the wires/conductors and the filler material; and
   at least one load carrying element at a predetermined location in the cross section of the umbilical,
   wherein the number of fluid pipes, the electric wires/conductors, the filler material and the at least one load carrying element, are alternately laid, i.e. by continuously alternating direction, in the entire or part of the longitudinal extension of the umbilical, to form a bundle and the laid bundle is kept fixed substantially torsion stiff by the protective sheath.

2. The umbilical according to claim 1, wherein the protective sheath includes a strength band, or tape that is helically wound about the bundle in two or more layers, laid in opposite directions.

3. The umbilical according to claim 1, wherein the protective sheath includes a strength band, or tape that is helically wound about the bundle by a relatively short laying length of 0.1 to 0.5 meters.

4. The umbilical according to claim 1, wherein the protective sheath includes a strength band that is made of metallic material.

5. The umbilical according to claim 1, wherein the protective sheath includes a strength band that comprises fiber armored ribbon, fiber armored ribbon with friction liner and textile ribbon, where the fiber armored ribbon is reinforced with aramid fiber, carbon fiber, glass fiber and other synthetic materials.

6. The umbilical according claim 1, wherein the laying of the number of fluid pipes, the electric wires/conductors, the filler material and at least one load carrying element alters direction at irregular intervals.

7. The umbilical according to claim 1, wherein the laying of the number of fluid pipes, the electric wires/conductors, the filler material and the at least one load carrying element constitutes approximately between one half and three revolutions before the laying changes direction.

8. The umbilical according claim 1, wherein the umbilical includes one or more separate layers with load carrying elements as an outer layer that is located immediately inside the protective sheath, said load carrying elements in each layer being laid in a continuous helix in the same direction in the entire length extension of the umbilical.

9. The umbilical according to claim 1, wherein the at least on load carrying element is at least one light weight rod of composite material and/or steel string or steel wire and/or fiber rope and/or polyester rope.

10. The umbilical according to claim 1, wherein the filler material is designed such that longitudinal grooves, or flutes, are formed therein such that the material of the outer sheath penetrates into the grooves when the material is extruded thereon, to create friction to increase the torsional stiffness of the umbilical.

11. The umbilical according to claim 10, wherein the protective sheath is a strength band that is wound by a certain distance between each winding such that a gap is formed between each winding for penetration of the sheath material.

12. The umbilical according to claim 1, further comprising a strength band, or tape, which is helically wound about the bundle immediately internal of the protective sheath.

13. The umbilical according to claim 1, wherein the laying of the number of fluid pipes, the electric wires/conductors, the filler material and the at least one load carrying element alters direction at regular intervals.

14. The umbilical according to claim 1, wherein the umbilical is without an outside armor layer outward of the number of fluid pipes and filler material.

15. A method of manufacturing and laying a number of elongate elements into an umbilical which includes a number of fluid pipes, electric wires and/or optical conductors, filler material located at least partially around and between the number of fluid pipes and the electric wires/conductors, the number of fluid pipes, the electric wires/conductors and filler material being collectively gathered into a twisted bundle, a protective sheath that encompasses the number of fluid pipes, the electric wires/conductors and the filler material, and at least one load carrying element at a predetermined location in the cross section of the umbilical in order to take care of axial loads, said method comprising the steps of:

alternately laying the number of fluid pipes, the electric wires/conductors, the filler material and the at least one load carrying element, i.e. by constantly alternating direction, in the entire or part of the longitudinal extension of the umbilical to form a laid bundle;

centrally or at least one load carrying element during the manufacture; and retaining the laid bundle substantially torsional stiff by applying the outer protective sheath.

16. The method according to claim 15, wherein the protective sheath includes a strength, band or tape that is helically wound about the bundle in two or more layers, laid in opposite directions.

17. The method according to claim 15, wherein the protective sheath includes a strength band that is helically wound about the bundle by a relatively short laying length of 0.1 to 0.5 meters.

18. The method according to claim 15, further comprising the step of carrying out the laying operation by alternating directions at irregular intervals.

19. The method according to claim 15, wherein the laying operation takes place approximately by one half to three revolutions before the laying alters direction.

20. The method according to claim 15, wherein the umbilical includes one or more separate layers with load carrying elements that are applied as an outer layer that is located immediately inside the protective sheath, said load carrying elements in each layer being laid in a continuous helix in the same direction in the entire length extension of the umbilical.

21. The method according to claim 15, wherein the filler material is designed such that longitudinal grooves, or flutes, are formed therein, said method further comprising the step of extruding the material of the outer sheath onto the bundle to penetrate into the grooves, and to create friction to increase the torsional stiffness of the umbilical.

22. The method according to claim 21, wherein the protective sheath includes a strength band or tape that is wound by a certain distance between each winding such that a gap is formed between each winding for penetration of the extruded sheath material into said grooves.

23. The method according to claim 15, further comprising the step of carrying out the laying operation by alternating directions at regular intervals.

\* \* \* \* \*